United States Patent
Cappello et al.

(10) Patent No.: US 8,325,571 B2
(45) Date of Patent: Dec. 4, 2012

(54) VIDEO JUKEBOX APPARATUS AND A METHOD OF PLAYING MUSIC AND MUSIC VIDEOS USING A VIDEO JUKEBOX APPARTUS

(76) Inventors: Paul Cappello, Oak Park, IL (US); Mariusz Stanisz, Chicago, IL (US); Ernest Thompson, Oak Park, IL (US)

( * ) Notice: Subject to any disclaimer, the term of this patent is extended or adjusted under 35 U.S.C. 154(b) by 1056 days.

(21) Appl. No.: 11/540,918

(22) Filed: Sep. 29, 2006

(65) Prior Publication Data
US 2007/0086280 A1 Apr. 19, 2007

Related U.S. Application Data

(60) Provisional application No. 60/722,129, filed on Sep. 29, 2005.

(51) Int. Cl.
*G11B 21/08* (2006.01)
(52) U.S. Cl. .................................. 369/30.06; 369/30.28
(58) Field of Classification Search ............... 369/30.04, 369/30.06, 30.28
See application file for complete search history.

(56) References Cited

U.S. PATENT DOCUMENTS

| | | | | |
|---|---|---|---|---|
| 5,959,945 | A * | 9/1999 | Kleiman | 381/81 |
| 6,308,204 | B1 * | 10/2001 | Nathan et al. | 709/221 |
| 2003/0021420 | A1 * | 1/2003 | Kamperman et al. | 380/277 |
| 2003/0083940 | A1 * | 5/2003 | Kumar et al. | 705/14 |
| 2004/0243482 | A1 * | 12/2004 | Laut | 705/27 |

* cited by examiner

*Primary Examiner* — Hoa T Nguyen
*Assistant Examiner* — Andrew Sasinowski
(74) *Attorney, Agent, or Firm* — Cherskov Flaynik & Gurda, LLC (57) ABSTRACT

A digital jukebox (14) allows for playback of a first offering and a second offering. The contents of each offering are individually licensed for public performance at a particular location where the jukebox is found. The jukebox (14) displays advertisements that are selected in response to user interaction with the jukebox or a number of other factors. The jukebox (14) features a screen (18 and 20) that allows user to interact with the jukebox to select offerings, but also to respond to advertising. Jukebox can function in cooperation with a server (12), but in the alternate, can function as an independent and stand-alone device when connection (16) to server (12) is not available.

14 Claims, 11 Drawing Sheets

VIDEO JUKEBOX APPARATUS AND A METHOD OF PLAYING MUSIC AND MUSIC VIDEOS USING A VIDEO JUKEBOX APPARTUS

This Utility Patent Application claims the benefit of U.S. Provisional Patent Application No. 60/722,129 filed on Sep. 29, 2005.

BACKGROUND OF THE INVENTION

1. Field of the Invention

Embodiments relate to a method and apparatus for a payment-triggered audiovisual display. Embodiments are directed in particular to a method and apparatus for displaying music, videos and advertisements using a jukebox (a digital video jukebox for example).

2. Background of the Invention

Audiovisual reproduction systems are known and are generally found in cafes or pubs. These systems are generally comprised of a sound reproduction machine usually called a jukebox linked to a monitor which displays video images or video clips. To do this, known jukeboxes are equipped with a compact video disk player and a compact video disk library and includes selection buttons (a touch screen or keypad for example) used to locate the titles of pieces of music which are available. After payment of a fee the system automatically loads a disk in the player on which the selected piece is found. The desired audiovisual reproduction then starts. One example of such a system does is disclosed in U.S. Pat. No. 5,228,015.

Such known systems, although providing faithful and good quality reproduction, nevertheless have a number of major defects, including the space necessary for storing the library; consequently entailing large and bulky systems. Likewise, these systems may use mechanical hardware having high fault rates. Finally, it is unusual for all the pieces on a disk to be played regularly; some of the pieces are almost never played, but cannot be eliminated from the library.

Jukebox systems that do not use physical CDs are also known. U.S. Pat. No. 4,956,768 discloses a broadband server for transmitting music or images formed by a main processor to a remotely located jukebox. The main processor communicates by a DMA channel with a hard disk and output cards, each controlled by a supplementary local processor which manages an alternative mode of access to two buffer memories A and B. Memory A is used to deliver, for example, musical data to a user, while the other is filled. Each of the output cards is connected to a consultation station, which can be local and situated in the same vicinity as the server or, alternatively, at a distance and connected by an audio or video communications network. The server receives data block-by-block and ensures that the sample parities are correct and rejects a block including more than two successive wrong samples.

U.S. Pat. No. 6,308,204 discloses a method for communication between a central server and a computerized jukebox, which operates in a conference mode. This method includes sending a header before any transaction, which includes the identity of the destination together with the identity of the emitter, and the size of the packets. A response is sent from the server in the form of a data packet, each packet sent by the server being encoded using the identification code of the jukebox software. The jukebox receives the data packet, decodes the packet, simultaneously performs a check on the data received by the CRC method and sends an acknowledgment of receipt to the server indicating the accuracy of the information received, to allow it to prepare and send another packet to the juke-box.

An additional example of a jukebox operating without the use of CD media is found in U.S. Pat. No. 5,481,509. The jukebox in that patent includes means for recording customer performances on analog tape, which requires conversion of digital music or video stored on the jukebox to analog signals in order to allow their recording on analog tape.

However, none of the described jukeboxes discuss playing music, videos and advertisements simultaneously and in a plurality of formats. To the extent that previous patents include monitors that could be adapted to display advertisements, no means are indicated as to how to adapt the selection of advertisement to the music previously selected. Changes to music libraries contained in jukeboxes described by previous patents require either (1) replacement of physical hard drive as in the jukebox described by U.S. Pat. No. 5,481,509 or alternatively (2) a connection to a server as in U.S. Pat. No. 6,308,204. The invention disclosed in this patent allows for updates to the jukebox music library without the need for either physical drive replacements or a constant connection to a distribution network. Further, none of the previously described jukeboxes describe means for playing digital content with individual licensing restrictions nor do the previous jukeboxes allow for connection of one or more add-on devices as described below.

SUMMARY OF INVENTION

The present invention relates to an apparatus, system and method for simultaneously playing music, videos and advertisements. One embodiment of the apparatus comprises a central processor, a storage device, a performance device, and a copy-control device. The central processor has operating software adapted to operate at least one device in the apparatus and selectively play the first and second offerings. The storage device communicates with at least the central processor and is adapted to store both the first and second offerings. The performance device communicates with at least the central processor, the data storage device, and the copy-control device and is adapted to play both the first and second offerings simultaneously if both are licensed for performance at the particular location.

In at least one embodiment, the first and/or second offering comprises one of an audio offering, a video offering and an audio-video offering. The first offering may comprise advertisements displayed in at least one of a plurality of formats (a marquee format scrolling along a portion of the performance device, a full screen format without audio on the entire performance device and/or a full screen format with audio on the entire performance device. Embodiments are contemplated in which the performance device comprises a video display (that may or may not have at least one user interface) and at least one speaker. Embodiments are further contemplated in which the apparatus includes a DJ add-on device, a karaoke add-on device, and/or at least one slave jukebox, each of which communicates with at least the central processor.

Yet another embodiment comprises a system for simultaneously playing first and second offerings, the network comprising at least a server and a video jukebox communicating with at least one said server. The server comprises a server central processor having operating jukebox software and at least one storage device. The video jukebox apparatus comprises a video jukebox central processor having jukebox operating software, the jukebox software adapted to operate at least one device in the video jukebox apparatus and selectively play the first and second offerings; a video jukebox storage device communicating with at least the video jukebox central processor and adapted to store both the first and second offerings; and a performance device communicating with at least the video jukebox central processor and the video jukebox storage device and adapted to play both the first and second offerings simultaneously. Within said system, the jukebox obtains new content from the server and the jukebox verifies the license status of the content to ensure that it is fully licensed for performance, while the server obtains usage and other statistics from the individual jukebox.

Still another embodiment comprises a method of controlling a video jukebox adapted to display first and second offerings. In this embodiment, the method comprises displaying the first offering in one of a plurality of available formats and selecting the second offering from a plurality of second offerings. The first offering is displayed simultaneously with the second offering, where each of the first and second offerings are displayed in one of a plurality of formats.

Embodiments are further contemplated in which the method comprises determining if the offering is stored on the video jukebox. If the offering is not stored on the jukebox, the method comprises downloading the offering (from the server for example).

BRIEF DESCRIPTION OF DRAWINGS

The invention together with the above and other objects and advantages will be best understood from the following detailed description of the drawings, wherein.

DETAILED DESCRIPTION OF THE INVENTION

Embodiments are provided related to a video jukebox apparatus (a digital video jukebox for example), and a system including a video jukebox apparatus adapted to play advertisements, music videos and movie media (in an MPEG format for example) as well as music. The system and apparatus are adapted to add revenue opportunities with an innovative advertising system, and allow for remote control, monitoring, and a variety of configuration and customization options. Additionally the system and apparatus adds value by integrating other useful media-related functions, such as a disc-jockey (DJ) and karaoke for example, including allowing the addition of lower-cost 'daughter' jukeboxes to a main jukebox at locations containing more than one jukebox, and by increasing media throughput, sales, and decreasing maintenance by eliminating the physical media normally used in jukeboxes. Embodiments load songs quicker and require less maintenance than a standard jukebox due to how the songs/videos are stored.

Figure 1:
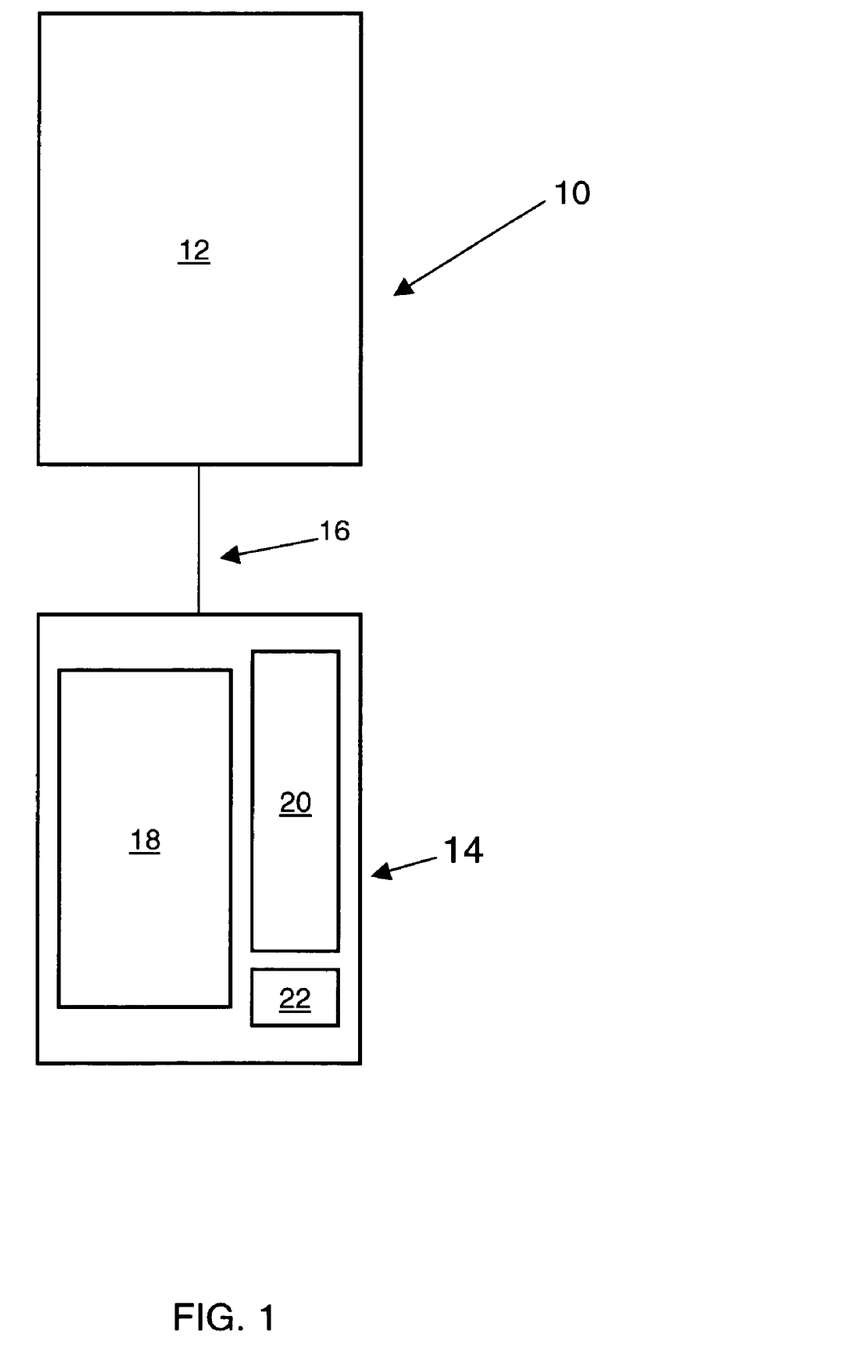
FIG. 1 depicts a schematic representation of a system including a jukebox for playing or performing music, videos and advertisements in accordance with one embodiment.

One embodiment relates to a system for playing or performing music, videos (music videos for example) and advertisements. FIG. 1 depicts a schematic representation of one embodiment of a system, generally designated 10, for performing music, videos and advertisements. The illustrated embodiment comprises a server 12 communicating with a jukebox 14 via a network or connection 16. It is contemplated that the server 12 and jukebox 14 may be located proximate to each other (i.e., in the same location where the server may be placed in a back room for example) or remote from each other (i.e., the server 12 is located in a central location for example). However, the jukebox 14 does not depend on the link to server 12 in order to make content available to customer for playback. Instead, jukebox 14 functions as an independent and stand-alone device that makes available for performance its contents as long as the contents are licensed for such performance. Therefore, the jukebox 14 will operate with its current library of licensed content if the connection to the server 16 is severed temporarily or even permanently removed. In one embodiment, the connection 16 may comprise a direct (i.e., a hardwired) connection, a connection through network, or some wireless connection. Embodiments of the jukebox 14 are adapted to load songs and videos quicker and require less maintenance than known standard jukeboxes due to how the songs/videos are stored.

It is contemplated that, in at least one embodiment, the jukebox 14 includes at least one user interface or video screen (two screens 18 and 20 are illustrated although one video screen adapted to display a plurality of images simultaneously is also suitable) and a currency acceptor 22. The jukebox 14 is adapted to provide music and videos (collectively, alternatively referred to as a "second offering") advertisements, alternatively referred to as a "first offering" and includes, marquee advertisements scrolling along the bottom of the video screen 18 while music or videos play. Silent graphic advertisements are displayed on the entire video screen 18 or 20 when only music plays. Audio-video and audio advertisements appear on the entire video screen when an idle search feature is performed to find songs/artists. Advertisements displayed appear on screen 18 or 20 are selected based on the content being played back by the user. Certain advertisements are coupled with some selections, such as an advertisement for a movie is coupled with the selection of the soundtrack to the movie. Other advertisements are invoked to appear on screen 18 or 20 when a particular genre of content is selected, such as an advertisement for an upcoming rock concert when that genre of music is selected. Also, some types of advertisements appear on screen 18 or 20 during different times of the day, such as advertisements for dinner entrees at or around dinnertime. During advertisements, users may be provided with the option of entering information through a user interface that appears on screens 18 and 20 to respond to the advertisement. Such response can include entering of personal information in order to participate in a contest or providing feedback about a particular commercial message. The responses can be stored on the jukebox 14 or transmitted directly to the recipient when no connection to server 12 is available or communicated to the server 12 when a connection to the server 12 is available.

The central server 12 allows the jukeboxes 14 to do the following: automatically download and install updated versions of the jukebox software; automatically download new music, videos and advertisements; automatically change blocked genre, artist and song settings; download operator or patron requested music and video selections; download new "skins" for the user interface; and an update frequency that is operator selectable. The server 12 is further adapted to allow the local operator to: view tracking data from jukeboxes off-site; control jukebox settings from off-site; force particular songs/videos to be stored locally from off-site; control advertisement settings from off-site; view error logs from off-site; receive alerts from off-site; configure which events generate an alert; configure how an alert is sent (vial email or page for example); receive alerts on critical errors; force particular songs/videos to be removed from local storage; create arbitrary groupings of jukeboxes, which allow all of the above to be performed on multiple jukeboxes 14 at multiple (different) locations at once. The server 12 allows the vendor to do all of the above in addition to allowing the vendor to restrict the local operator's access to certain functions. These functions are suspended when server connection 16 is not available, but are automatically restored when server connection 16 returns to active status.

Figure 2:
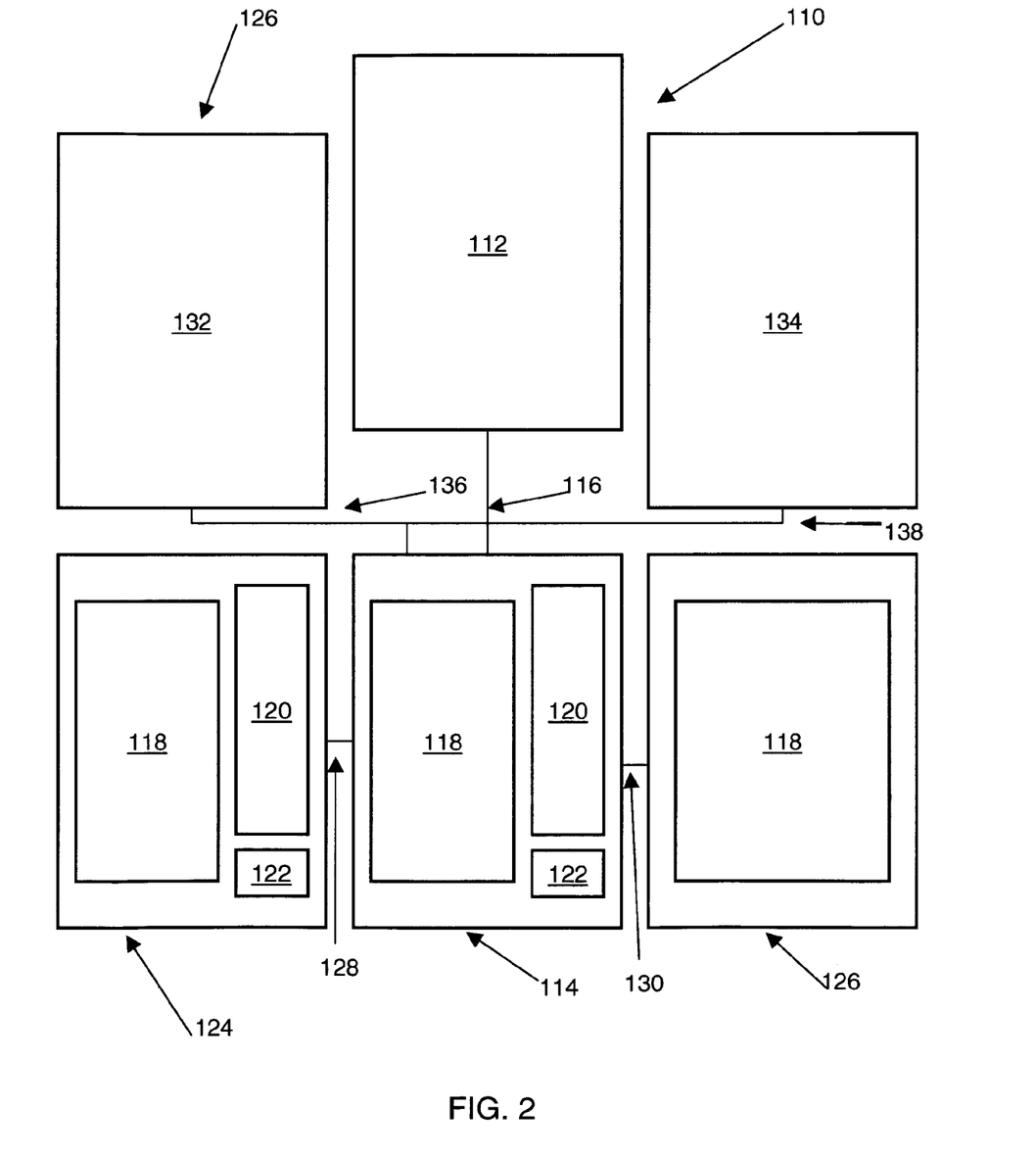
FIG. 2 depicts a schematic representation of a system including a jukebox for playing or performing music, videos and advertisements similar to that of FIG. 1 in accordance with one embodiment.

Turning now to FIG. 2, a schematic representation of a system or network generally designated 110, including a video jukebox 114 for playing or performing music, videos and advertisements similar to that of FIG. 1 is depicted. In the illustrated embodiment, the jukebox 114 is coupled to and communicating with the server 112 via the network or connection 116 and includes at least one user interface or video screen (depicted as screens 118 and 120) and a currency acceptor 122. Two screens 118 and 120 are illustrated although one video screen adapted to display a plurality of images simultaneously is contemplated. Jukebox 114 is adapted to provide music, music videos (second offering) and advertisements (first offering) even in instances where network connection 116 is not available, allowing the jukebox to operate as an independent and stand-alone device.

Various modes of advertising are provided, including, for example, marquee advertisements scrolling along the bottom of video screen 118 while music or videos play. Alternatively silent graphic advertisements display on the entire video screen 118 while only music plays. In another mode video and audio advertisements appear on the entire video screen 118 while an idle search feature is conducted for songs/artists).

Additionally, the system 110 may include one or more of the following: a slave daughter/dumb terminal 124; a separate or stand-alone display or monitor 126; a DJ add-on device or module 132; and/or a karaoke add-on device or module 134.

The operator/vendor can access the jukebox 114 (via a keypad or touch screen interface) to schedule advertisement priorities and display frequency; block artists and songs by genre, artist, or individual song; track song play data (which songs are played, when they are played and how often for example); and track sales data (gross sales and peak usage times for example). In at least one embodiment, the operator/vendor can access the jukebox 114 (using a wired or wireless control device for example) to skip songs, control the volume, view/change jukebox settings, view tracking data and determine when the bill acceptor is near capacity (using an alert for example).

The system or network 110 further may include one or more "Dumb Terminal" or daughter jukeboxes 124 (only one daughter jukebox is illustrated, although more are contemplated), which stream song data from the central jukebox 114, thereby inexpensively accommodating multiple jukeboxes at a single location. In the illustrated embodiment, the daughter jukebox 124 is coupled to and communicates with the jukebox 114 via connector 128 (hardwired or wireless) and includes at least one user interface or video screen (two screens 118 and 120 are illustrated although one video screen adapted to display a plurality of images simultaneously is contemplated) and currency acceptor 122. Jukebox 124 is adapted to provide music, videos (second offering) and advertisements (first offering).

The network 110 further may include one or more displays or monitors 126 (only one display is illustrated, although more are contemplated) adapted to stream or otherwise provide song data from the central jukebox 114. In the illustrated embodiment, the display or monitor 126 is coupled to and communicates with jukebox 114 via connection 130 (hardwired or wireless) and includes at least one user interface or video screen 118 adapted to display a plurality of images simultaneously. Like the jukeboxes 114 or 124, display or monitor 126 is adapted to provide music, videos and advertisements. In at least one embodiment, the display 126 may comprise wireless devices (PCs or handheld devices able to communicate with the jukebox 114).

FIG. 2 also depicts a DJ add-on device or module 132 coupled to and communicating with jukebox 114 via connector 136 (hardwired or wireless). The illustrated add-on device 132 provides a DJ with access to the jukebox 114 via a terminal (a hardwired or wireless terminal for example), enabling the DJ to: control the song queue; song volume; use a "turntable" interface enabling him to run a plurality of music/video selections (two for example) simultaneously, and fade between them. The DJ add-on module or device 132 further allows the DJ to run custom messages (in the marquee advertisement section for example); select silent video ads to run (while playing music selections for example); use a PA system (a jukebox sound system for example); and enable the DJ to import a prearranged play list, complete with volume and A/B fade information. In at least one embodiment, the DJ add-on device or module 132 includes a graphic user interface (through screens 118 and 120 on jukeboxes 124 and 114, for example) allowing users or patrons to request songs and allows the jukebox bill acceptor 122 to accept and track tip money.

A karaoke add-on device or module 134 is illustrated coupled to and communicating with jukebox 114 via connector 138 (hardwired or wireless). In at least one embodiment, the device or module 134 includes at least one video monitor (similar to monitor or display 118 for example), providing lyric output. The karaoke add-on device or module 134 operates in a plurality of modes: a standard (i.e., non-karaoke) mode; a jukebox or pay to sing mode, enabling patrons to select a karaoke song; and a DJ mode in which the operator or vendor controls which karaoke songs to play and in which the customers or patrons use the jukebox interface to browse the operator's selections. The device or module 134 enables the operator/vendor to control the microphone volume, song volume, and aggregate jukebox volume; switch the jukebox between standard mode and the two karaoke modes. Embodiments further include enabling recording and mixing audio; recording and mixing video; and burning a DVD or CD to sell to customers.

Figure 3:
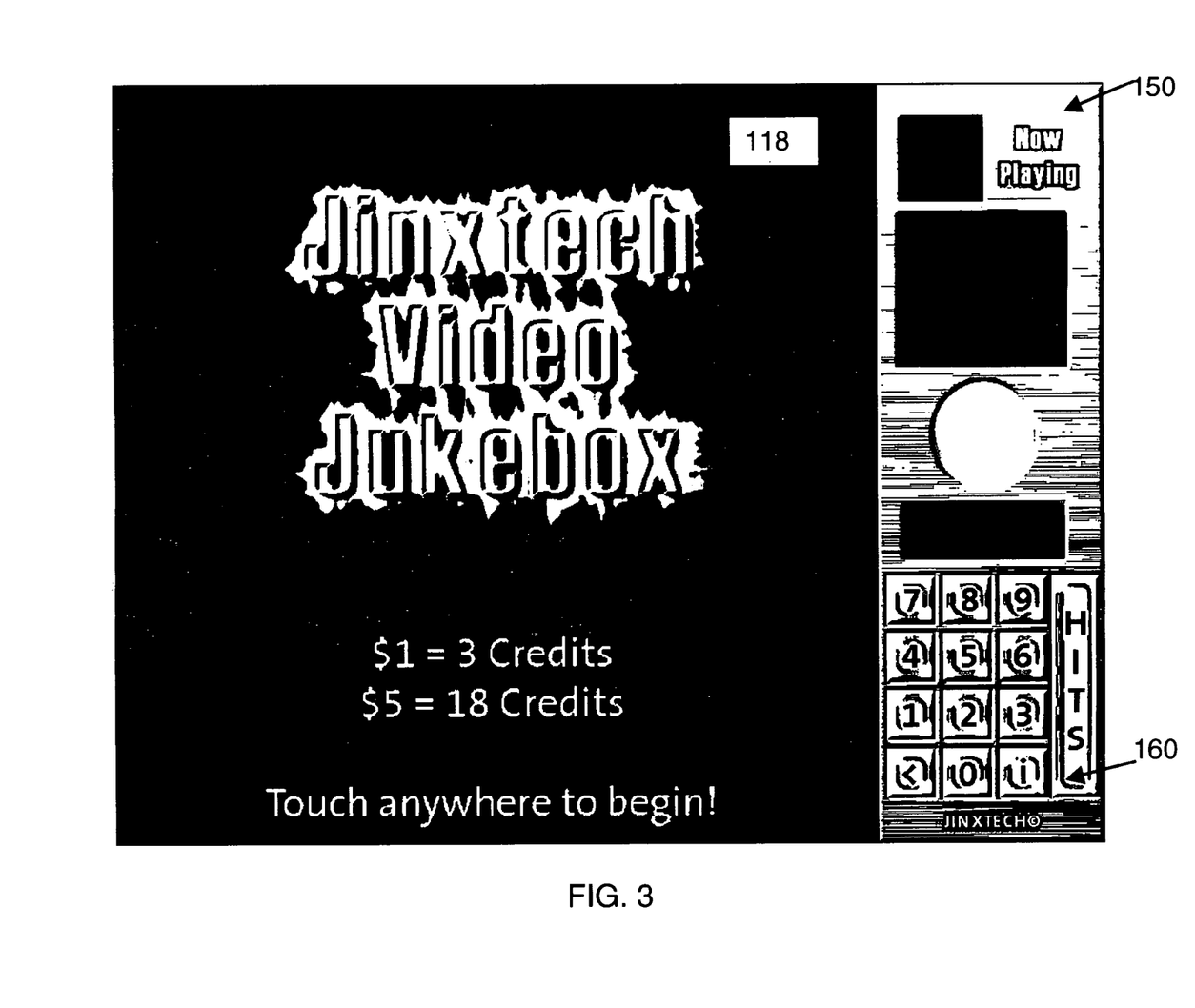
FIG. 3 depicts a screen shot of the jukebox screen of FIGS. 1 and 2 in accordance with one embodiment.
Figure 4:
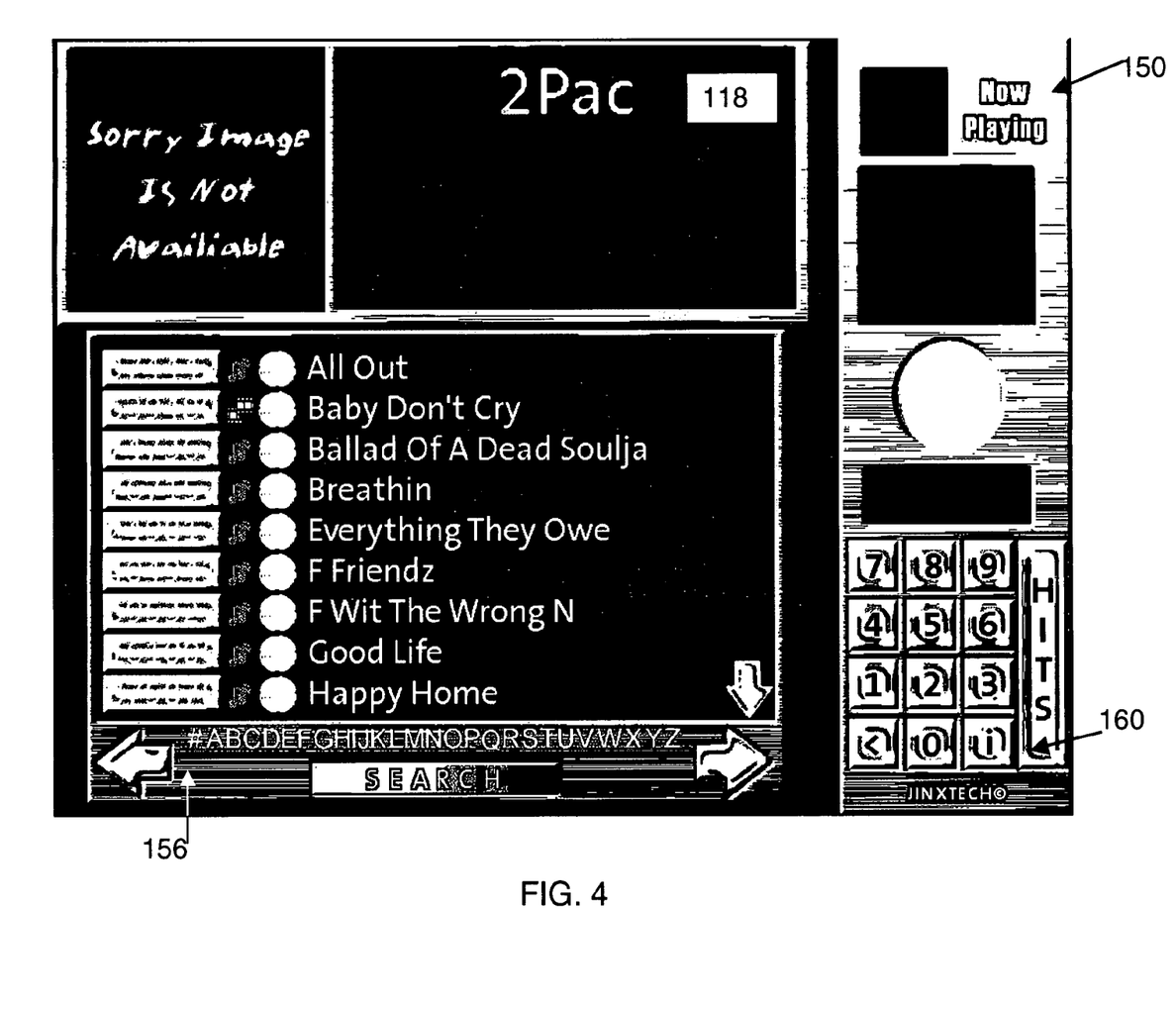
FIG. 4 depicts another screen shot of the jukebox video screen of FIGS. 1 and 2 in accordance with one embodiment.
Figure 5:
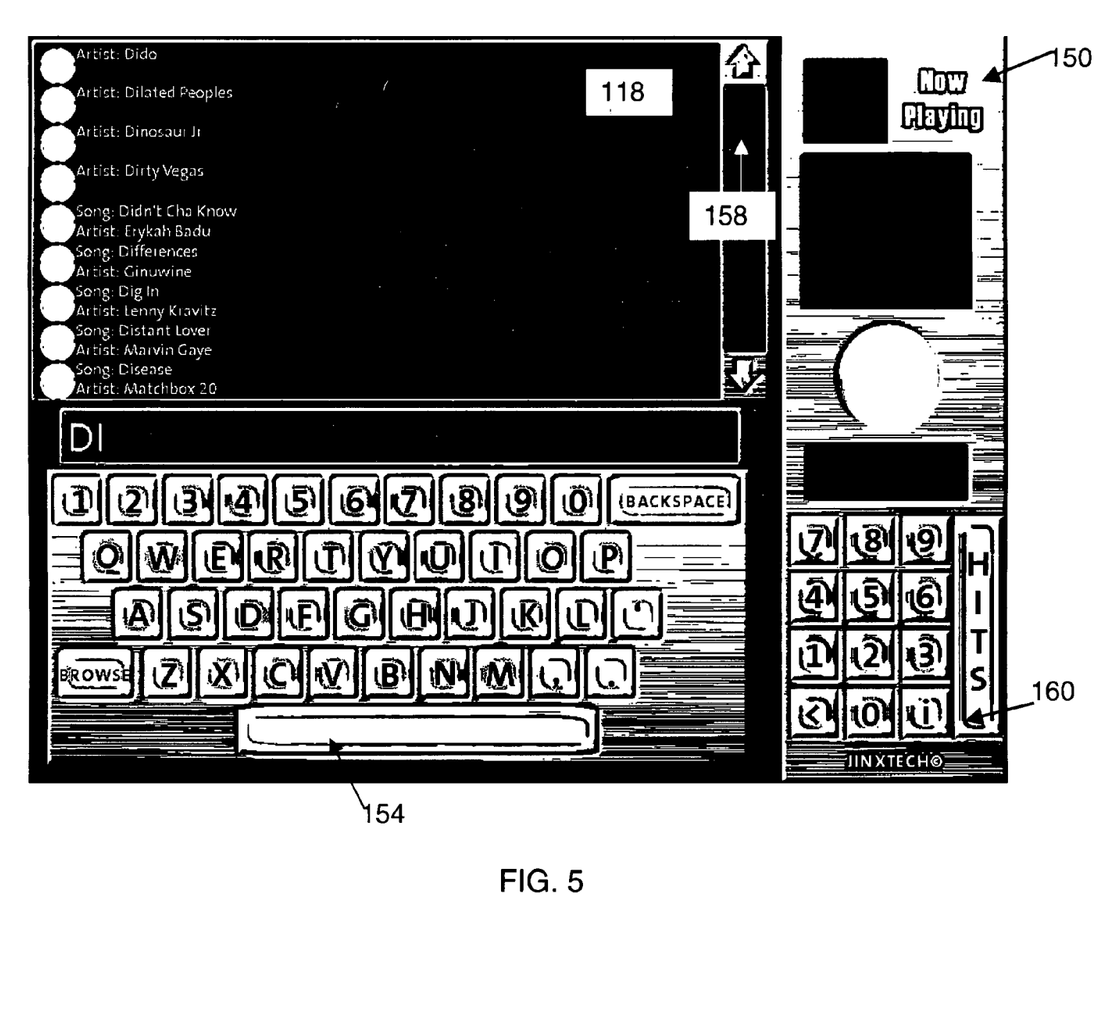
FIG. 5 depicts yet another screen shot of the jukebox video screen of FIGS. 1 and 2 in accordance with one embodiment.

FIGS. 3, 4 and 5 depict screen images of the jukebox 14/114 illustrated in FIGS. 1 and 2 in accordance with one embodiment. As provided previously, the jukebox 14/114 includes at least one user interface or video screen 118 adapted to display a plurality of images simultaneously. In the illustrated embodiment, user interface or video screen 118 displays at least one "skin" 150 or visual display format that may be selected by the operator or vendor. In at least one embodiment, the skin may be automatically updated or changed using the server 10, or in instances where the jukebox operates without a connection 16 to the server 10, the skin 150 can be changed at the jukebox 14/114 itself.

In the embodiment illustrated in FIGS. 3, 4 and 5, skin 150 divides the video screen 118 into a plurality of video screen portions adapted to display a plurality of images. In the illustrated embodiment, the video screen portions may display the location name, owner name or information on the currently playing song/artist (for example artist name, performer photograph where available, and song titles as illustrated in FIG. 4). It should be appreciated that the skin is changeable depending on the user/patron selection (i.e., the number of video portions may change as shown in FIGS. 3, 4, 5) in addition to being modifiable or updateable using the server as provided previously. In one embodiment, the video screen includes a search feature 154 allowing users/patrons to find songs/artists quickly (best viewed in FIG. 5); an alphabet slide bar feature 156 allowing users to quickly navigate through the selection list (best viewed in FIG. 4); a scroll bar 158 for scrolling through displayed information (song titles for example as illustrated in FIG. 5 for example) and a keypad 160 for inputting a song number directly, in addition to providing information about the number of credits available.

Figure 6:
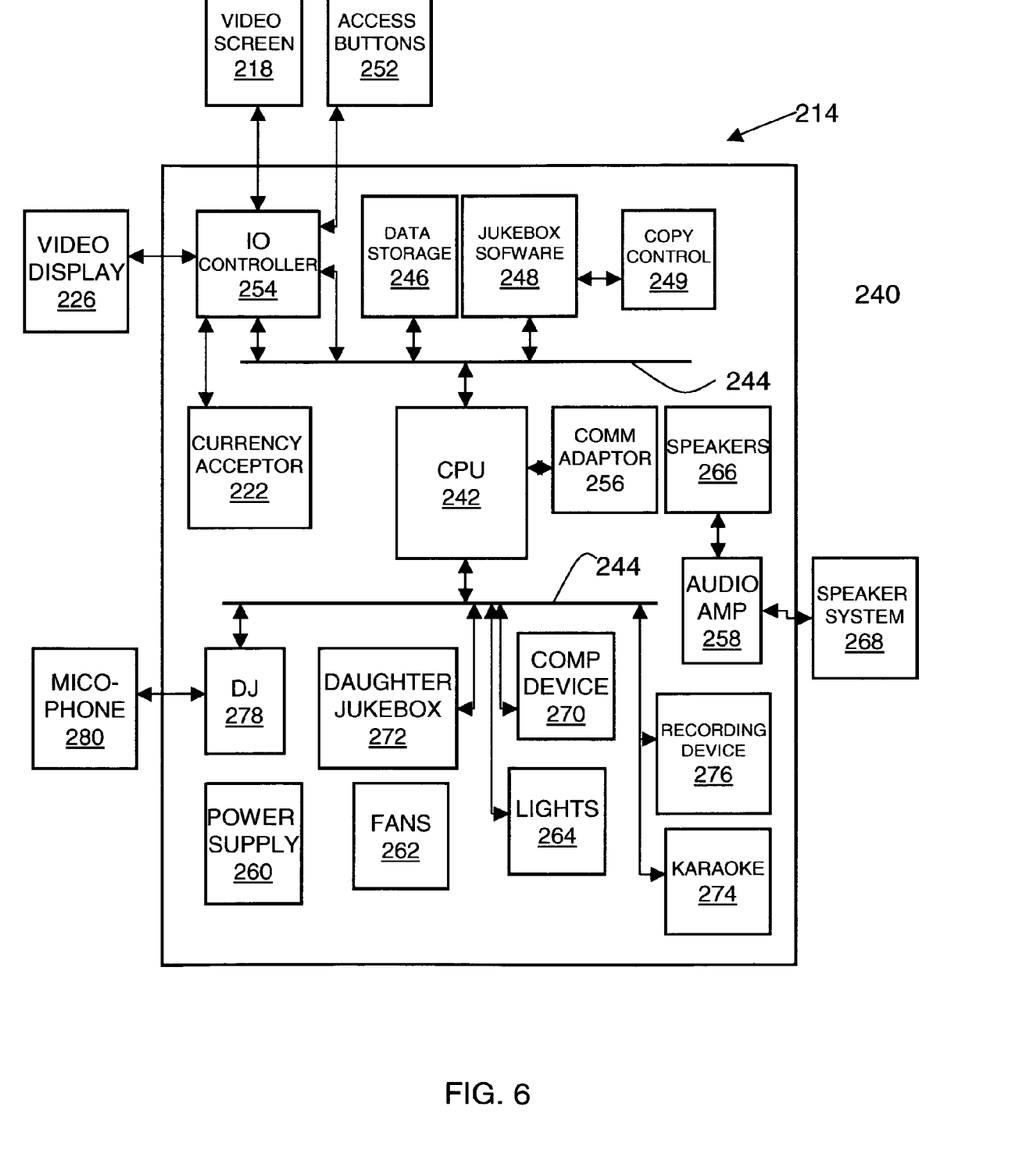
FIG. 6 depicts a schematic representation of a jukebox similar to that of FIGS. 1 and 2 in accordance with one embodiment.

FIG. 6 depicts a schematic representation of a jukebox 214 similar to that depicted in FIGS. 1 and 2. It is contemplated that at least one embodiment allows the jukebox 214 to: automatically download (from a server for example) and install updated versions of the jukebox software; automatically download new music, videos and advertisements; automatically change blocked genre, artist and song settings; download operator or customer requested music and video selections; download new "skins" for the user interface and provide operator selectable update frequency. It is further contemplated that the jukebox 214 allows an operator to: view tracking data from jukeboxes off-site; control jukebox settings from an off-site or remote location; force local storage of particular songs/videos (second offerings) from an off-site or remote location; control advertisement (first offerings) settings from off-site; view error logs from an off-site or remote location; receive alerts from an off-site or remote location; configure which events generate an alert; configure how an alert is sent (for example via email, page, etc.); receive alerts on critical errors; force particular songs/videos to be removed from local storage; and create arbitrary groupings of jukeboxes, which allow all of the above to be performed on multiple jukeboxes at multiple locations at once. In addition to all the above, the jukebox 214 allows the vendor to restrict the local operator's access to certain functions. However, the jukebox 214 functions as a stand-alone and independent device when a connection to the server is not present. During times of network connectivity interruption, jukebox 214 displays those selections currently available for playback on jukebox 214. The operation of jukebox 214 is not interrupted by the lack of connectivity through adaptor 256, nor is the end-user of jukebox 214 informed of the lack of connectivity.

In the depicted embodiment, the jukebox apparatus 214 having a housing 240 comprises a general purpose computing device or CPU 242 (an Intel 80×86 based PC for example) having one or more connectors or buses 244 coupled thereto and communicating therewith. The jukebox includes one or more random access data storage devices or modules 246 (a 250 Gigabyte hard drive for example) coupled to a bus 244 and jukebox software or operating instructions 248. In this embodiment, the software is depicted as a separate module, but it is contemplated that it may run on any of the devices or modules in the jukebox 214 (on CPU 242 for example). In one embodiment, the software 248 comprises one or more jukebox preload control programs that enable changing the jukebox 214 settings and communicating with the server software (discussed below); a jukebox user interface software; database storage software; and jukebox remote control software (which may be installed on the jukebox or on the operator/vendor control device as provided below), and the copy control device 249. It should be appreciated that, in at least one embodiment, the jukebox remote control software and jukebox user interface software communicate with at least each other using a communications protocol. The copy control device 249 contains a uniquely identifying sequence that allows software 248 to verify the identity of the location at which location the software 249 is currently operating. Jukebox control software 248 ensures that it is licensed to operate at that particular location, and that content to be played back is fully licensed for public performance at its current location. Information regarding the location where content can be played back is stored in encrypted form in a variety of formats along with the content itself on data storage device 246. The jukebox software 248 verifies that contents of data storage 246 are available for playback at the particular location by decrypting the copy protection information in the content found on storage device 246 by providing the specific decryption algorithm for the content found on storage 246 with the unique identifier found in the copy control device 249. Jukebox software 248 can support a number of copy control decryption algorithms, including subscription based decryption algorithms or per-file decryption. If one of the decryption algorithms is no longer supported in the marketplace, it can be removed from the jukebox software 248 and contents of data storage 246 can be updated with a new encryption algorithm.

Embodiments of the jukebox 214 may further include one or more of the following devices or modules: a currency acceptor 222; user accessible control buttons 252; a video screen 218; a computer I/O controller 254; a computer communications adapter 256 (a network card for example); an audio amplifier 258; a power supply 260; cooling fans 262; lights and other decorative devices 264; speakers 266; one or more video monitors or displays; an external speaker system 268; a general purpose computing device 270; karaoke add-on software module 274, a recording device 276, DJ add-on software module 278, and a microphone 280, one or more of which is illustrated communicating with the CPU 242 (via bus 244 for example).

In this embodiment, the computer I/O controller 254 is illustrated communicating with the currency acceptor 222 and the user accessible buttons 252. The currency acceptor 222 accepts user/patron payments (a bill or credit card acceptor for example). The user accessible control buttons 252 enable the patrons to search for music or artists and input information, alone or in some combination with video screen 218 (using a touch screen for example). General purpose computing device 270 allows the operator/vendor to control the jukebox 214 using an operator/vendor control device (using a general purpose computing device with wireless or other network capabilities) having at least jukebox remote control software running thereon.

As provided previously, the system or network provides for connecting one or more "Dumb Terminal" or daughter jukeboxes to the jukebox (best viewed in FIG. 2). The daughter jukebox includes at least one user interface or video screen and currency acceptor. In at least one embodiment, such daughter jukebox add-on module comprises a daughter jukebox add-on software module 272 installed on jukebox 214 (on CPU 242 for example). Additionally, such daughter jukebox add-on module would comprise jukebox user interface program (not shown) installed or running on each daughter jukebox and daughter jukebox control add-on software module installed on the operator/vendor control device (not shown). Further, in at least one embodiment, the daughter jukebox add-on software module 272, jukebox user interface program with daughter jukebox add-on module, and the daughter jukebox add-on control software module communicate with each other user a communications protocol, while the daughter jukebox add-on software module 272 communicates with the jukebox preload control program using a communications protocol, which may be the same or different protocol from any of those discussed previously.

Embodiments further include a central server coupled to and communicating with at least the jukebox through the communication adapter 256, as provided previously. The server allows the jukeboxes to: automatically download and install updated versions of the jukebox software; automatically download new music, videos and advertisements; automatically change blocked genre, artist and song settings; download operator or patron requested music and video selections; download new "skins" for the user interface; and operator selectable update frequency. The server is further adapted to allow the local operator to: view tracking data from jukeboxes off-site; control jukebox settings from off-site; force particular songs/videos to be stored locally from off-site; control advertisement settings from off-site; view error logs from off-site; receive alerts from off-site; configure which events generate an alert; configure how an alert is sent (vial email or page for example); receive alerts on critical errors; force particular songs/videos to be removed from local storage; create arbitrary groupings of jukeboxes, which allow all of the above to be performed on multiple jukeboxes at multiple different locations at once. The server allows the vendor to do all of the above in addition to allowing the vendor to restrict the local operator's access to certain functions.

Figure 7:
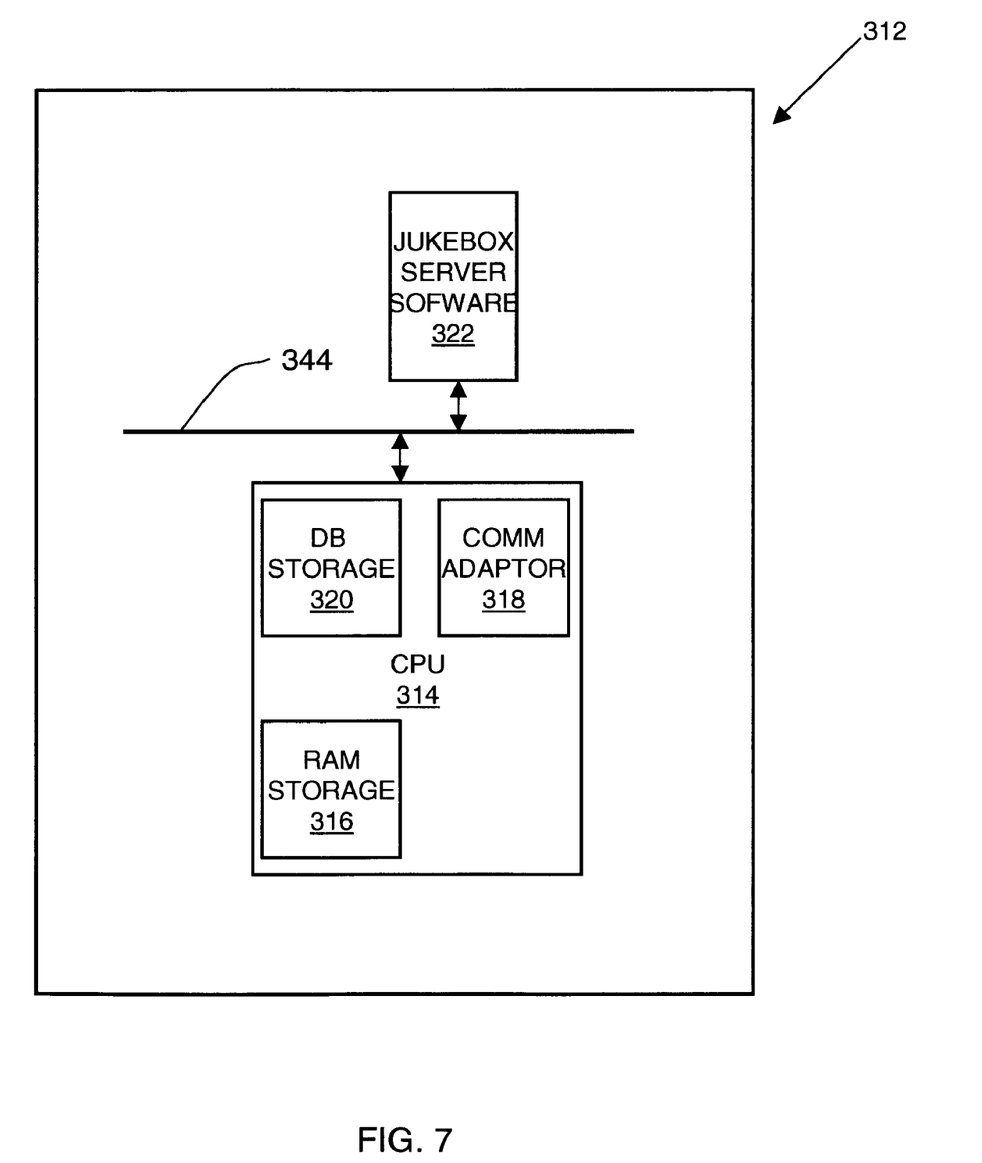
FIG. 7 depicts a schematic representation of a server similar to that of FIGS. 1 and 2 in accordance with one embodiment.

FIG. 7 provides a schematic representation of one embodiment of a server, generally designated 312 adapted to communicate with any of the jukeboxes discussed previously. Server 312 comprises one or more general purpose CPU or computing devices 314. As illustrated, at least one embodiment of CPU 314 comprises a storage device 316 (a random access storage device) and a communications adapter device 318 (a PC server or server cluster for example) and a database storage device 320. FIG. 7 further illustrates Jukebox Server software 322 as a separate module, but other embodiments are contemplated. One embodiment of the Jukebox server software module comprises web server software and a jukebox server software suite installed and running on CPU 314. It should be appreciated that, in at least one embodiment, the jukebox server software suite and the jukebox preload control program communicate with at least each other using a communications protocol, which may be the same or different protocol from that discussed previously. Communication between various elements of server 312 takes place over one or more connectors or buses 344 coupled thereto and communicating therewith.

Figure 8:
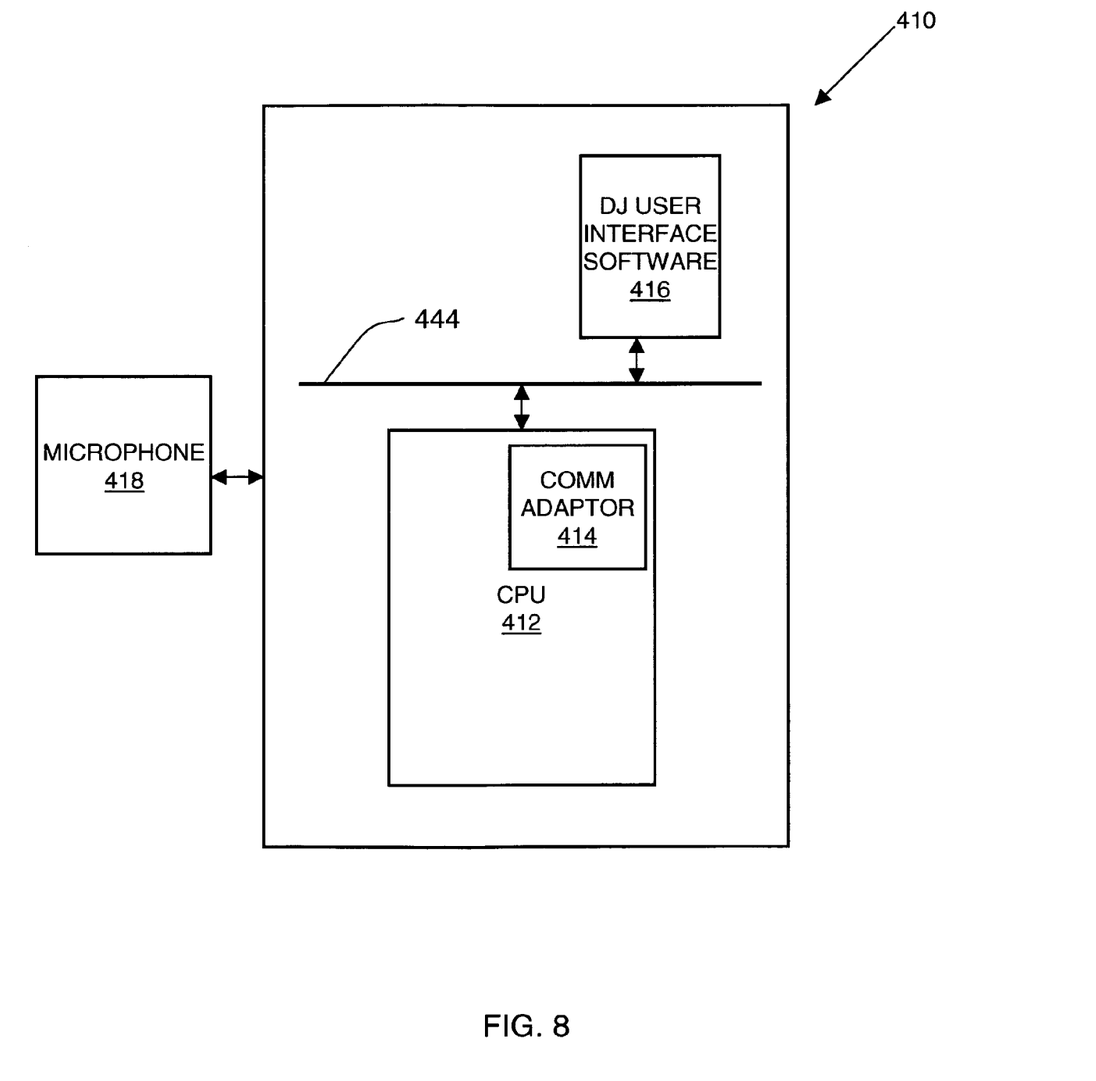
FIG. 8 depicts a schematic representation of a DJ add-on device similar to that of FIG. 2 in accordance with one embodiment.

FIG. 8 depicts a schematic representation of a DJ add-on device or module, generally designated 410 similar to the device 132 (best viewed in FIG. 2) and adapted to be coupled to and communicate with a jukebox 14/114 similar to that depicted in FIGS. 1 and 2. The illustrated add-on device 410 provides DJ access to the jukebox via a terminal (a hardwired or wireless terminal for example), enabling the DJ to control the song queue; song volume; use a "turntable" interface enabling the DJ to run a plurality of music/video selections (two for example) simultaneously, and fade between them. The DJ add-on module or device 410 further allows the DJ to run custom messages (in the marquee advertisement section for example); select silent video ads to run (while playing music selections for example); use a PA system (using the jukebox sound system for example); and enable the DJ to import a prearranged play list, complete with volume and A/B fade information. In at least one embodiment, the DJ add-on device or module 410 includes a graphic user interface allowing users or patrons to request songs and allows the jukebox bill acceptor to accept and track tip money. The elements of DJ add on device 410 communicate through a number of connectors or busses 444 coupled thereto.

FIG. 8 depicts the DJ add-on device or module 410 comprising a general purpose computing device or CPU 412 (a PC or laptop for example) having a communications adapter 414. The device or module further comprises DJ software or operating instructions, in this embodiment comprising a DJ user interface program 416 which may be installed and run on the CPU 412 and DJ add-on software module 278 (best viewed in FIG. 6) which may installed or operating on the jukebox. Additionally, the DJ add-on device may comprise a microphone 418 (similar to microphone 280 illustrated in FIG. 2) coupled to and communicating with a CPU 412. It should be appreciated that, in at least one embodiment, the DJ user interface program 416 and the DJ add-on software module 278 (best viewed in FIG. 6) communicate with at least each other using a communications protocol, which may be similar to or different from any of the protocols discussed previously.

Figure 9:
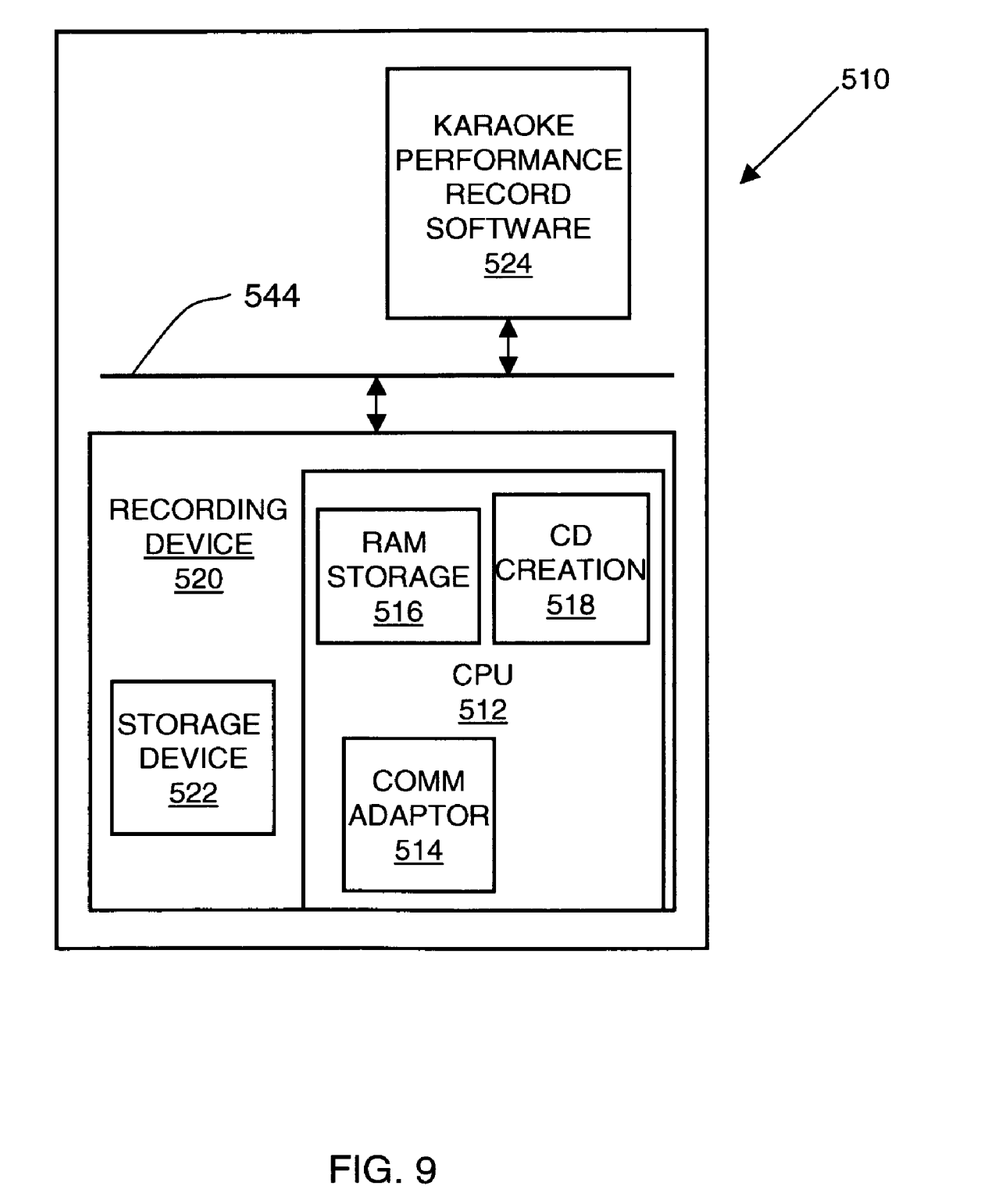
FIG. 9 depicts a schematic representation of a Karaoke add-on device similar to that of FIG. 2 in accordance with one embodiment.

FIG. 9 depicts a schematic representation of a karaoke add-on device or module, generally designated 510, similar to add-on device 134 depicted in FIG. 2. The karaoke add-on device or module 510 is illustrated coupled to and communicating with one or more of the jukeboxes described previously. In at least one embodiment, the device or module 510 includes at least one video monitor (similar to monitor or display 118 in FIG. 2 for example), providing lyric output. The karaoke add-on device or module 410 operates in a plurality of modes: a standard mode; a jukebox or pay to sing mode, enabling patrons to select a karaoke song; and a DJ mode, enabling the operator or vendor to control which karaoke songs to play and the customers or patrons use a jukebox interface to browse such selections. The device or module 510 enables the operator/vendor to control the microphone volume, song volume, and aggregate jukebox volume; switch the jukebox between standard mode and the two karaoke modes. Embodiments further include enabling recording and mixing audio, burning a CD to sell to customers; and recording and mixing video, burning a DVD or CD to sell to customers.

The illustrated karaoke add-on device 510 comprises a general purpose computing device 512 having a communications adaptor 514. Embodiments of the CPU 512 further comprise a storage device 516 (a random access storage device for example) and a CD creation device 518 (a CD burner for example). The device 510 further may include a video recording device 520 (a video recorder for example) having storage device 522 (a solid state video storage device or DVD burner for example). The karaoke add-on device 510 communicates through the communications adaptor 514 with copy control device 249 to ensure that any recordings made are allowed under the license of the specific content used to create the karaoke presentation. It is contemplated that the karaoke add-on device may include software or operating instructions. In one embodiment, karaoke add-on software or operating instructions may comprise one or more of the following: karaoke add-on software module 274 installed on the jukebox (best viewed in FIG. 6); karaoke performance recording software program 524 installed on the recording device 520 or the CPU 512; and karaoke control add-on software module that may be installed on the operator/vendor control device for example (not shown). Further, in at least one embodiment, the karaoke performance recording software program 524 and the karaoke add-on software module 274 communicate with at least each other using a communications protocol, while the karaoke control add-on software module communicates with the karaoke add-on software module 274 using a communications protocol, which may be the same or different protocol from any of those discussed previously. The elements of the karaoke add-on device communicate through a series of connections or busses 544.

Figure 10A:
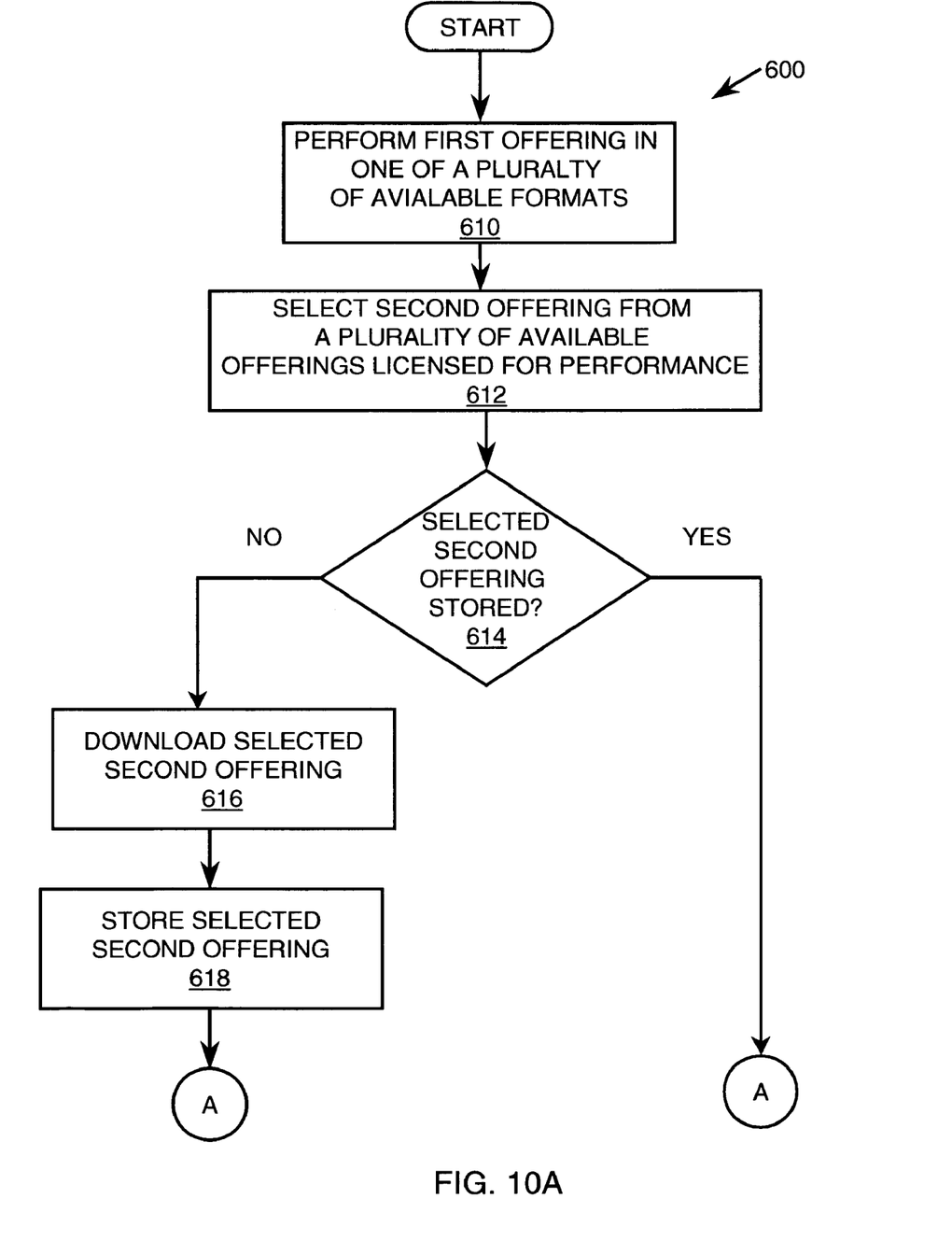
FIGS. 10A and 10B depict a high level flow chart illustrating one method of playing music, videos and advertisements in accordance with one embodiment.
Figure 10B:
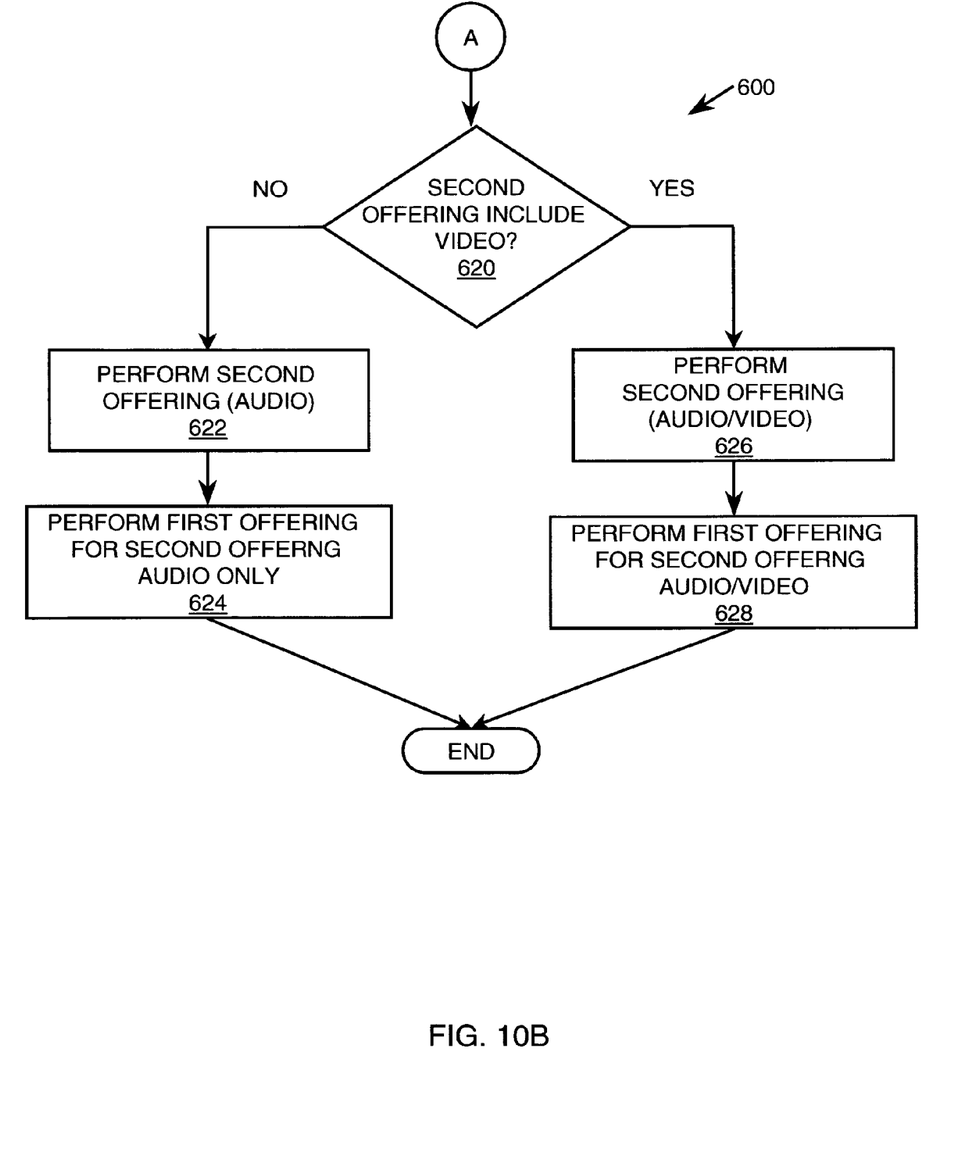

FIGS. 10A and 10B depict a high level flow chart illustrating one method, generally designated 600, of controlling a video jukebox (a digital jukebox for example) adapted to display first and second offerings. In at least one embodiment, the method 600 comprises performing a first offering, block 610, in one of a plurality of available formats (a full screen advertisement with audio for example). The first offering comprises a selection from a plurality of available offerings. Following the performance of the first offering, the embodiment further comprises selecting a second offering, block 612, from a plurality of available offerings. For both the first and second offering, available offerings are those that are already present and licensed on the jukebox, or when a connection to the server is present, available offerings also includes those that can be obtained from the server and placed on the jukebox with a license for playback. Method 600 further comprises determining, diamond 614, if the selected second offering is stored on the jukebox. If the selected second offering is stored on the jukebox, method 600 determines, diamond 620, if the second offering includes video, diamond 620.

If the second offering is not already stored on the jukebox, method 600 further comprises downloading the selected second offering, block 616. The downloaded, selected second offering is stored (on the jukebox for example), block 618. Method 600 then determines, diamond 620, if the stored, downloaded, selected second offering includes video (MPEG for example).

If the second offering does not include video, method 600 plays the audio only second offering, block 622. The method further comprises simultaneously performing the first offering for the audio second offering (full screen advertisement without audio for example), block 624. If the second offering includes video, method 600 plays the audio-video second offering, block 626). The method further comprises simultaneously performing the first offering for audio/video second offering (advertisement in a marquee format for example), block 628.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The embodiment of the invention in which an exclusive property or privilege is claimed is defined as follows:

1. An independent, stand-alone apparatus for simultaneously playing first and second offerings in a jukebox format, the apparatus comprising:
  A) a central processor having operating instructions, said instructions operate at least one device in the apparatus and simultaneously play the first and second offerings;
  B) a storage device communicating with at least said central processor and stores both the first and second offerings;
  C) a simultaneous performance device communicating with at least said central processor and said data storage device wherein said performance device plays both the first and second offerings simultaneously; and
  D) a rights management control device comprising a unique identifier wherein said rights management control device communicates with the performance device and wherein the rights management device is verifies license status of presentations by said performance device and of software used on the said central processor device by comparing the rights management control device unique identifier with copy control information found in the first offering and the second offering wherein the copy control unique identifier comprises identity of the location at which apparatus is operating and wherein apparatus software ensures that it is licensed to operate at that particular location and that content to be played back is fully licensed for public performance at its current location;
and wherein the first offering and the second offering each comprise audiovisual materials played back simultaneously.

2. The apparatus of claim 1 wherein said performance device comprises a video display and at least one audio performance device.

3. The apparatus of claim 2 wherein said video display further includes at least one user interface.

4. The apparatus of claim 3 wherein said first offering comprises advertisements, said advertisements are displayed on basis of said second selection, wherein in response to said advertisements the user interface provides opportunity for user-generated feedback.

5. The apparatus of claim 1 wherein said rights management control device comprises a uniquely identifiable hardware element and a software element which ensures that both first and second audio or video offering to be played back on the performance device is licensed for performance by the said performance device.

6. The apparatus of claim 1 further comprising a DJ add-on device communicating with at least said central processor.

7. The apparatus of claim 1 further comprising at least one slave jukebox communicating with at least said central processor.

8. A system for simultaneously playing first and second offerings, the network comprising:
  A) a server comprising:
    1) a server central processor having operating jukebox software;
    2) at least one storage device;

B) a video jukebox apparatus communicating with at least said server, said video jukebox apparatus comprising:
1) a video jukebox central processor having jukebox operating software, said jukebox software operates at least one device in said video jukebox apparatus and selectively play the first and second offerings;
2) a video jukebox storage device communicating with at least said video jukebox central processor and stores both the first and second offerings;
3) a simultaneous performance device communicating with at least said video jukebox central processor and said video jukebox storage device and plays both the first and second offerings simultaneously; and
4) a rights management device communicating with said performance device and said central processor wherein said rights management device comprises a unique identifier and said rights management device is verifies license status of presentations by said performance device and of software used on the said central processor device by comparing the unique identifier with the copy protection information found in the first offering and the second offering wherein the copy control unique identifier comprises identity of the location at which apparatus is operating and wherein apparatus software ensures that it is licensed to operate at that particular location and that content to be played back is fully licensed for public performance at its current location; and wherein the first offering and the second offering each comprise audiovisual materials played back simultaneously.

9. The system of claim 8 wherein the video jukebox apparatus communicates with said server with no interruption of availability to jukebox apparatus even in eventuality of lack of response from said server.

10. The system of claim 8 wherein the first offering comprises one of an audio offering, a video offering and an audio-video offering.

11. The system of claim 10 wherein said first offering comprises advertisement displayed in a marquee format scrolling along a portion of said performance device or in a full screen format on the entire performance device.

12. The system of claim 8 wherein the second offering comprises one of an audio offering, a video offering and an audio-video offering.

13. The system of claim 12 comprising at least one display communicating with at least said video jukebox apparatus displays the first and second offerings.

14. The system of claim 8 comprising at least one of a DJ add-on device, a karaoke add-on device and a slave juke box device communicating with at least said video jukebox apparatus.

* * * * *